United States Patent [19]

Yamamoto et al.

[11] Patent Number: 4,841,445
[45] Date of Patent: Jun. 20, 1989

[54] ELECTRONICALLY CONTROLLED AUTOMATIC TRANSMISSION

[75] Inventors: Masanari Yamamoto; Yasunobu Ito; Shouji Yokoyama, all of Anjo, Japan

[73] Assignee: Aisin-Warner Kabushiki Kaisha, Anjo, Japan

[21] Appl. No.: 83,392

[22] Filed: Aug. 10, 1987

[30] Foreign Application Priority Data

Aug. 11, 1986 [JP] Japan .................. 61-188197

[51] Int. Cl.$^4$ ............... G06F 15/50; G06F 7/70
[52] U.S. Cl. .......................... 364/424.1; 74/866
[58] Field of Search ............... 364/424.1; 74/863, 866

[56] References Cited

U.S. PATENT DOCUMENTS

| | | | |
|---|---|---|---|
| 3,943,799 | 3/1976 | Sakai et al. | 364/424.1 X |
| 4,335,428 | 6/1982 | Miki | 74/866 |
| 4,551,802 | 11/1985 | Smyth | 364/424.1 |
| 4,637,278 | 1/1987 | Nishikawa et al. | 74/866 |

Primary Examiner—Eugene R. LaRoche
Assistant Examiner—Nathan W. McCutcheon
Attorney, Agent, or Firm—Varndell Legal Group

[57] ABSTRACT

In accordance with the invention, the mounting position of a throttle opening sensor is adjusted in such a manner that the output voltage of the sensor attains a value a value of $V_{100}$ at a throttle opening of 100%. When execution of the system program starts, $V_0$ is stored in memory as initialized voltage data at a throttle opening of 0%. A throttle opening $\theta\alpha$ corresponding to sensed voltage data $V\alpha$ is calculated in an arithmetic unit in accordance with the following equation:

$$\theta_\alpha = \frac{V_0 - V_\alpha}{V_0 - V_{100}} \times 100(\%) \qquad 1$$

The throttle opening - output voltage characteristic may change due to an error in mounting the throttle opening sensor, a change in the length of the throttle cable caused by a temperature variation, or a change in resistance value caused by aging. If such is the case and a voltage $V'_0$ greater than the previously stored voltage $V_0$ prevailing at the throttle opening of 0% is sensed, then $V'_0$ is stored in memory as new voltage data corresponding to the throttle opening of 0%. Thereafter, a throttle opening $\theta'\alpha$ corresponding to sensed voltage data $V'\alpha$ is calculated in accordance with Eq. (1). Therefore, since an adjustment is made so as to absorb any variance in the throttle opening - output voltage characteristic of the throttle opening sensor, an accurate throttle signal can be obtained at all times despite a change in the characteristic of the throttle opening sensor when the sensor is mounted or due aging.

1 Claim, 6 Drawing Sheets

ELECTRONICALLY CONTROLLED AUTOMATIC TRANSMISSION

BACKGROUND OF THE INVENTION

This invention relates to an electronically controlled automatic transmission in which shift solenoids are controlled by a microcomputer in dependence upon a signal indicative of vehicle velocity and a signal indicative of the degree of throttle opening. More particularly, the invention relates to an electronically controlled automatic transmission of the type described in which a signal outputted by a throttle opening sensor is adjusted automatically.

In a microcomputer-controlled automatic transmission having a torque converter with a lock-up clutch, shifting generally is controlled in the manner shown in FIG. 6.

In FIG. 6, an automatic transmission 1 is equipped with a torque converter 2 on its input side. The latter has a housing 3 in which there are provided a pump impeller 4, a turbine runner 5 and a lock-up clutch 6. In the torque converting region of a gearchange pattern, the lock-up clutch 6 is freed from the housing 3, so that power from the engine is transmitted to the automatic transmission through the pump impeller 4 and turbine runner 5. In the lock-up region, the lock-up clutch 6 is engaged with the housing 3, whereby power from the engine is transmitted directly to the automatic transmission via the housing 3.

The automatic transmission 1 comprises a well-known group of planetary gears and a friction engagement unit for locking and releasing the elements of the planetary gears. By selectively actuating friction elements automatically in a hydraulic circuit 7 in dependence upon the traveling condition of the vehicle, the vehicle can be made to travel in an optimum speed. The hydraulic circuit 7 is provided with shift solenoids 8, 9 and a lock-up solenoid 10. On the basis of a combination of on/off signals applied to the shift solenoids 8, 9 to energize or de-energize them, the aforementioned friction elements are selectively actuated to shift speeds. The lock-up clutch 6 is engaged or disengaged based on whether the lock-up solenoid 10 is energized or de-energized. The solenoids 8, 9 and 10 are actuated by an electronic control unit (ECU) 11 in dependence upon vehicle velocity and throttle opening on the basis of a gear-change pattern decided for each and every shift position. More specifically, the ECU 11 includes an input signal processing circuit 15, a CPU 16 and a solenoid driver circuit 17. Output signals from a shift position sensor 12, a velocity sensor 13 and a throttle opening sensor 14 are applied to the CPU 16 via the input signal processing circuit 15. The CPU 16 has a memory storing gear-change patterns and lock-up diagrams. A gear-change pattern and lock-up diagram which correspond to the shift position (e.g. D range or L range) are selected, an optimum speed commensurate with the vehicle velocity and throttle opening is decided on the basis of the selected gear-change pattern, engagement or disengagement of the lock-up clutch 6 is determined based on the lock-up diagram, and an appropriate signal is delivered to the solenoid driver circuit 17 to actuate the solenoids 8, 9 and 10 accordingly.

The aforementioned throttle opening sensor 14 has a throttle opening - output voltage characteristic that exhibits a statistical dispersion resulting from the manufacturing process. In order to reduce a deviation in shift point and lock-up point resulting from this dispersion, the conventional practice is to adjust the mounting position of the throttle opening sensor in such a manner that a predetermined output voltage will be obtained at a throttle opening of 100% (or 0% if desired), and finely adjust the mounting position in such a manner that the output voltage will be suppressed, within the range of tolerance of the throttle cable length, at a throttle opening on the opposite side, namely 0% (or 100%).

When the mounting position of the conventional throttle opening sensor is adjusted on the side where the throttle opening is 100% (or 0%), as shown in FIG. 7, a problem that arises is that the dispersion or variance on the opposite side (namely the 0% or 100% side) cannot be absorbed. In other words, assume that a in FIG. 7 is the designed characteristic of the throttle opening sensor. In such case the throttle opening when the throttle sensor output voltage is $V_\theta$ should be $\theta_2\%$. However, where the actual throttle sensor characteristic is b, the ECU will will render a determination to the effect that the throttle opening with respect to the output voltage $V_\theta$ is $\theta_1\%$. Accordingly, whereas a shifting of gears and engagement or disengagement of the lock-up clutch should take place at a shift point and lock-up point corresponding to a throttle opening of $\theta_2\%$, these occur at a shift point and lock-up point corresponding to the throttle opening of $\theta_1\%$. As a result, the shift point and lock-up point corresponding to the throttle opening of $\theta_2\%$ deviate from their correct positions.

A similar problem arises when the throttle opening - output voltage characteristic varies due to a change in the length of the throttle cable caused by a variation in temperature, or due to a change in resistance value caused by aging.

SUMMARY OF THE INVENTION

Accordingly, an object of the present invention is to provide an electronically controlled automatic transmission in which an optimum gear change can be performed by preventing any deviation in shift point and lock-up point caused by variance in the characteristic of a throttle opening sensor.

According to the present invention, the foregoing object is attained by providing an electronically controlled automatic transmission in which shift solenoids are controlled by a microcomputer in dependence upon vehicle velocity signal and a signal indicative of throttle opening, comprising: a throttle opening sensor for generating a voltage conforming to a throttle opening; memory means for storing voltage data indicative of a throttle opening of 0% and a throttle opening of 100%; and arithmetic means for calculating a throttle opening corresponding to sensed voltage data in accordance with the voltage data in the memory means; the data stored in the memory means being rewritten when new voltage data are sensed as voltage data indicative of a throttle opening of 0% and/or 100%.

Thus, in accordance with the invention as shown, for example, in FIG. 2, the mounting position of the throttle opening sensor is adjusted in such a manner that the output voltage of the sensor attains a value of $V_{100}$ at a throttle opening of 100%. When the program executed by the CPU of the system ECU starts to be run, $V_0$ is stored in memory as initialized voltage data at a throttle opening of 0%. A throttle opening $\theta_\alpha$ corresponding to sensed voltage $V\alpha$ is calculated in an arithmetic unit 21 in accordance with the following equation:

$$\theta_\alpha = \frac{V_0 - V_\alpha}{V_0 - V_{100}} \times 100(\%) \qquad 1$$

The throttle opening - output voltage characteristic may change due to an error in mounting the throttle opening sensor, a change in the length of the throttle cable caused by a temperature variation, or a change in resistance value caused by aging. If such is the case and a voltage $V'_0$ greater than the previously stored voltage $V_0$ prevailing at the throttle opening of 0% is sensed, then $V'_0$ is stored in memory as new voltage data corresponding to the throttle opening of 0%. Thereafter, a throttle opening $\theta_\alpha'$ corresponding to sensed voltage data $V_\alpha'$ is calculated in accordance with Eq. (1).

Therefore, since an adjustment is made so as to absorb any variance in the throttle opening - output voltage characteristic of the throttle opening sensor, an accurate throttle signal can be obtained at all times despite a change in the characteristic of the throttle opening sensor when the sensor is mounted or due aging. This prevents any deviation in the shift point and lock-up point that might otherwise be caused by a variance in the characteristic of the throttle opening sensor, thereby making it possible to optimize a speed change.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

Preferred embodiments of the invention will now be described with reference to the drawings.

Figure 1:
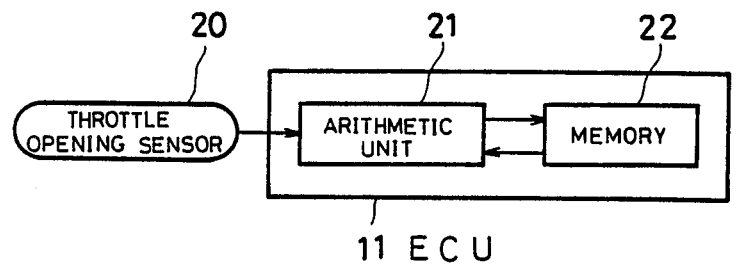
FIG. 1 is a block diagram illustrating an example of an arrangement for adjusting a throttle opening sensor signal in accordance with the invention.
Figure 2:
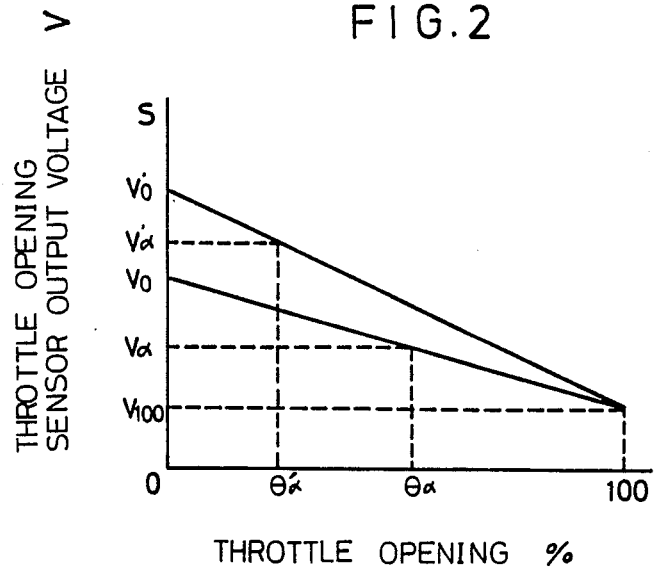
FIG. 2 is a view useful in describing an embodiment of a method of adjusting a throttle opening sensor signal in accordance with the invention.
Figure 3:
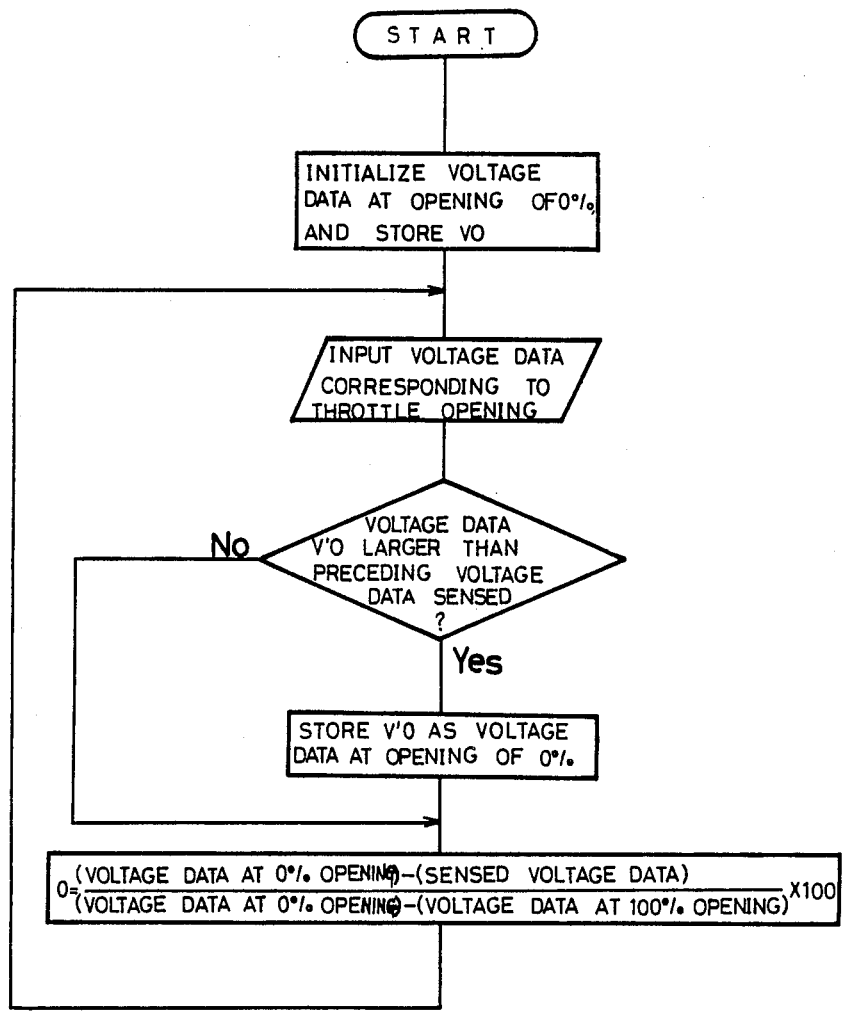
FIG. 3 is a flowchart of processing for a case where the adjustment method of FIG. 2 is adopted.
Figure 4:
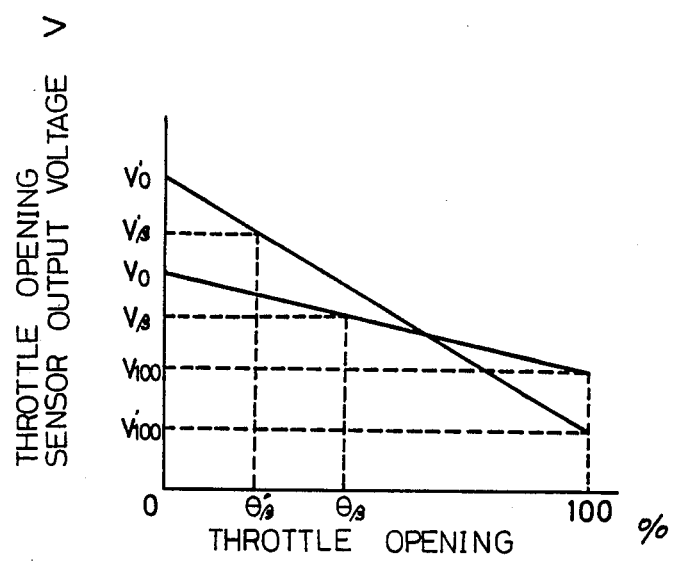
FIG. 4 is a view useful in describing another embodiment of a method of adjusting a throttle opening sensor signal in accordance with the invention.
Figure 5:
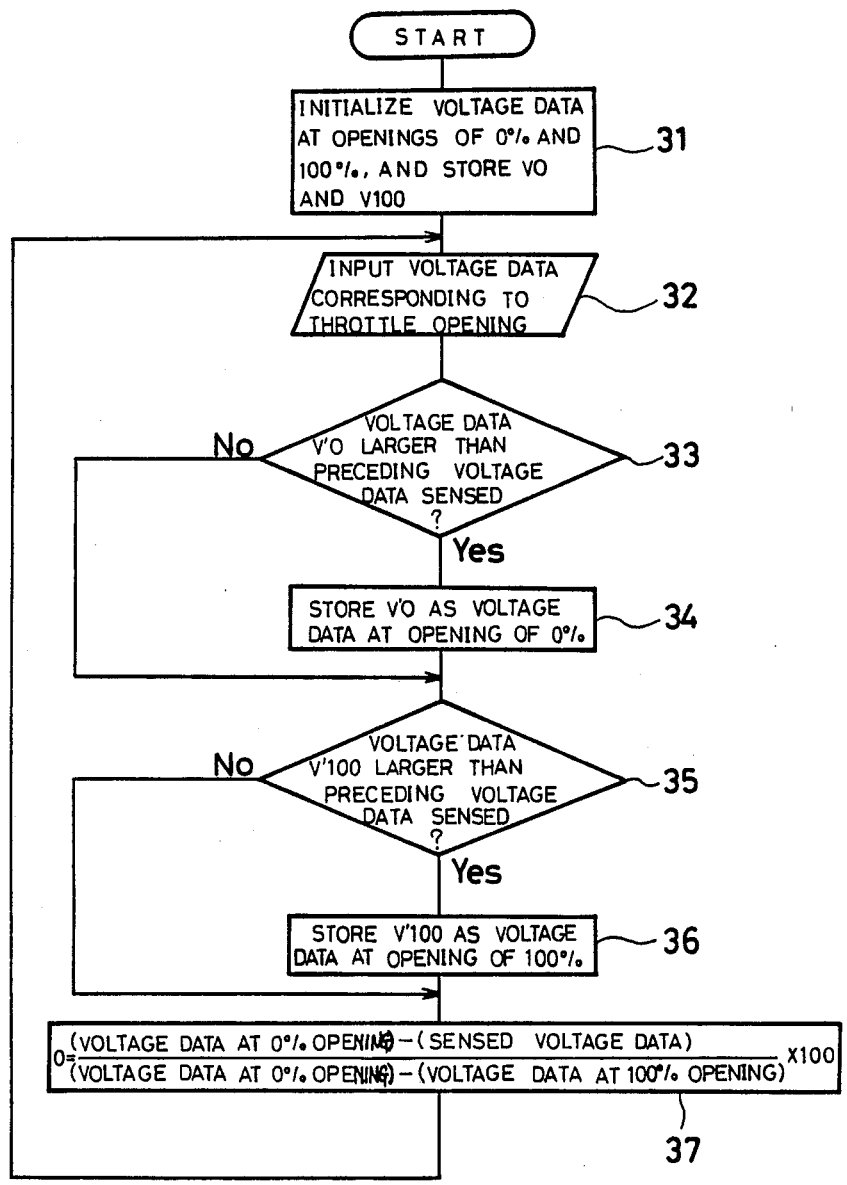
FIG. 5 is a flowchart of processing for a case where the adjustment method of FIG. 4 is adopted.
Figure 6:
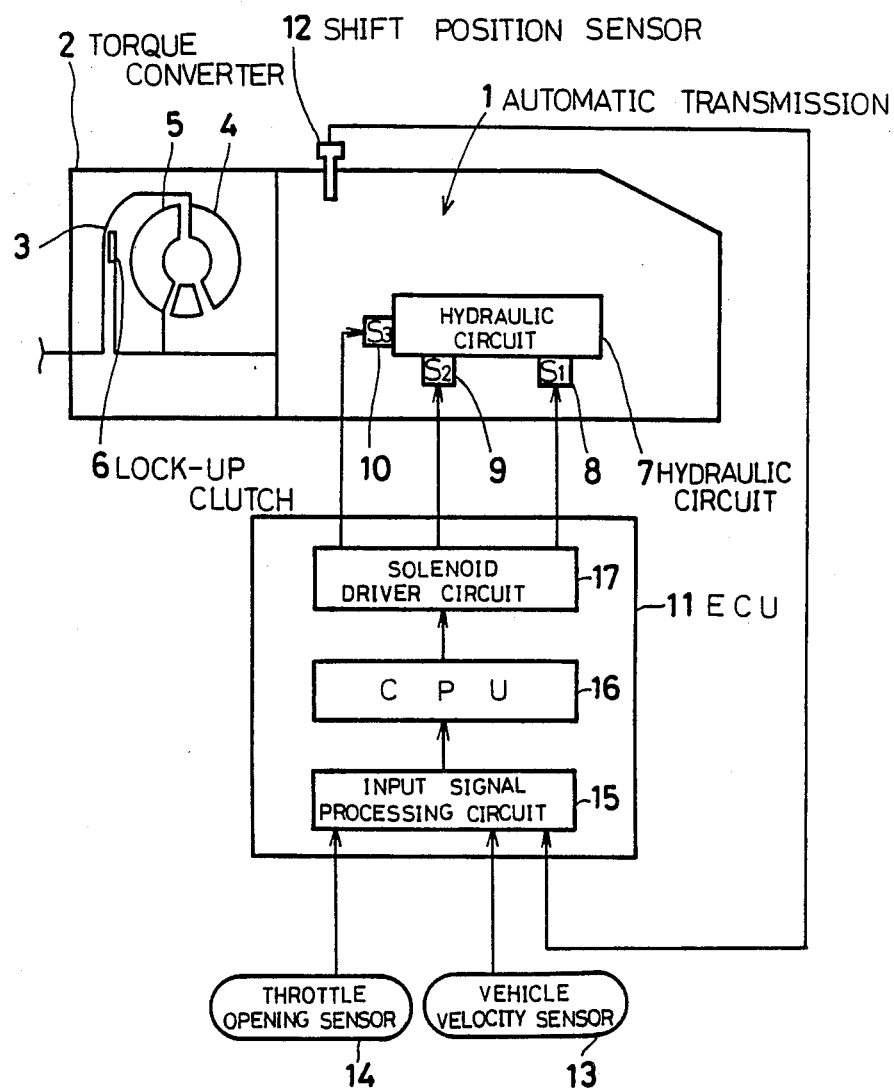
FIG. 6 is a schematic view showing the construction of a control system of a common electronically controlled automatic transmission.
Figure 7:
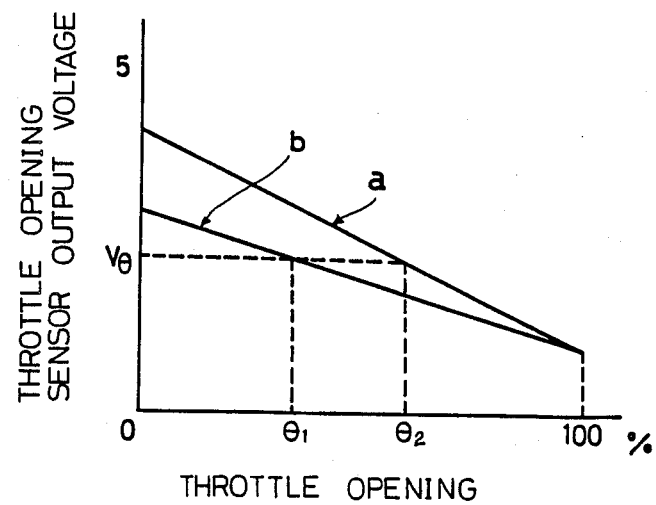
FIG. 7 is a view useful in describing the opening - output voltage characteristic of a throttle opening sensor.

FIG. 1 is a block diagram illustrating an example of an arrangement for adjusting a throttle opening sensor signal in accordance with the invention, FIG. 2 is a view useful in describing an embodiment of a method of adjusting a throttle opening sensor signal in accordance with the invention, FIG. 3 is a flowchart of processing for a case where the adjustment method of FIG. 2 is adopted, FIG. 4 is a view useful in describing another embodiment of a method of adjusting a throttle opening sensor signal in accordance with the invention, and FIG. 5 is a flowchart of processing for a case where the adjustment method of FIG. 4 is adopted.

With reference to FIG. 1, a throttle valve sensor 20 is of a linear type for generating a voltage proportional to a throttle opening. The output voltage of the sensor 20 is applied to an arithmetic unit in the ECU 11, which also includes a memory 22 storing voltage data corresponding to a throttle opening of 0% and 100%. On the basis of the voltage data corresponding to the throttle openings of 0% and 100%, the arithmetic unit 21 calculates a throttle opening corresponding to any voltage data. In a case where new voltage data are sensed as voltage data coresponding to a throttle opening of 0% and/or 100%, the arithmetic unit 21 rewrites the contents of the memory 22.

FIG. 2 illustrates an embodiment of a method of adjusting the throttle signal in accordance with the invention. The mounting position of the throttle opening sensor is adjusted in such a manner that the output voltage of the sensor attains a value of $V_{100}$ at a throttle opening of 100%. When the program executed by the ECU 11 starts to be run, $V_0$ is stored in memory 22 as initialized voltage data at a throttle opening of 0%. The voltage $V_0$ is set to a minimum value taking into consideration the characteristic of the throttle opening sensor 20. A throttle opening $\theta_\alpha$ corresponding to sensed voltage data $V_\alpha$ is calculated in the arithmetic unit 21 in accordance with the following equation:

$$\theta_\alpha = \frac{V_0 - V_\alpha}{V_0 - V_{100}} \times 100(\%) \qquad 1$$

The throttle opening - output voltage characteristic may change due to an error in mounting the throttle opening sensor 20, a change in the length of the throttle cable caused by a temperature variation, or a change in resistance value caused by aging. If such is the case and a voltage $V'_0$ greater than the previously stored voltage $V_0$ prevailing at the throttle opening of 0% is sensed, then $V'_0$ is stored in memory 22 as new voltage data corresponding to the throttle opening of 0%. Thereafter, a throttle opening $\theta_\alpha'$ corresponding to the sensed voltage data $V_\alpha'$ is calculated in accordance with Eq. (1).

It should be noted that if the sensor characteristic has the opposite inclination, a voltage $V'_0$ smaller than the previously stored voltage $V_0$ prevailing at the opening of 0% is stored in the memory 22 when sensed. Further, if the mounting position of the sensor is to be adjusted on the 0% side in terms of the throttle opening, the voltage data prevailing at the opening of 100% is used instead of the voltage data prevailing at the opening of 0%. This will enable the automatic adjustment function to be performed through the above-decribed procedure.

The foregoing processing will now be described with reference to the flowchart of FIG. 3. First, the throttle opening voltage data are inputted after the output voltage $V_0$ at the opening of 0% is initialized. Next, it is determined whether voltage data $V'_0$ larger in magnitude than the immediately preceding voltage data corresponding to the throttle opening of 0% have been sensed. If the answer is NO, then the throttle opening $\theta_\alpha$ is calculated in accordance with Eq. (1). If the answer is YES, on the other hand, then $V'_0$ is stored in memory as new voltage data corresponding to the opening of 0%, after which the throttle opening $\theta_\alpha$ is calculated in accordance with Eq. (1).

FIG. 4 is a view useful in describing another embodiment of a method of adjusting a throttle opening sensor signal in accordance with the invention. In this case, an automatic adjustment is performed on both sides, namely on the side of 0% opening and 100% opening.

When the program starts, $V_0$ and $V_{100}$ are stored in memory as output voltage data from the throttle opening sensor at openings of 0% and 100%, respectively. This constitutes an initialization processing. A throttle opening $\theta_\beta$ for sensed voltage data $V_\beta$ is calculated by the arithmetic unit 21 in accordance with the following equation:

$$\theta_\beta = \frac{V_0 - V_\beta}{V_0 - V_{100}} \times 100(\%) \quad 2$$

The throttle opening - output voltage characteristic may change due to an error in mounting the throttle opening sensor 20, a change in the length of the throttle cable caused by a temperature variation, or a change in resistance value caused by aging. If such is the case and a voltage $V'_0$ greater than the previously stored voltage $V_0$ at the throttle opening of 0% or a voltage $V'_{100}$ smaller than the previously stored voltage $V_{100}$ at the throttle opening of 100% is sensed, then $V'_0$ or $V'_{100}$ is stored in memory 22 as new voltage data corresponding to the throttle opening of 0% or 100%. Thereafter, a throttle opening $\theta'_\beta$ corresponding to the sensed voltage data $V'_\beta$ is calculated in accordance with Eq. (1).

It should be noted that if the sensor characteristic has the opposite inclination, a voltage $V'_0$ smaller than the previously stored voltage $V_0$ at the opening of 0% and a voltage $V'_{100}$ larger than the previously stored voltage $V_{100}$ at the opening of 100% are stored in the memory 22 when sensed. Specifically, $V'_0$ and $V'_{100}$ are stored in memory as new voltage data corresponding to openings of 0% and 100%, respectively.

The foregoing processing will now be described with reference to the flowchart of FIG. 5. At a step 32, the throttle opening voltage data are inputted after the output voltages $V_0$, $V_{100}$ at the openings of 0% and 100% are initialized at a step 31. Next, at a step 33, it is determined whether voltage data $V'_0$ larger in magnitude than the immediately preceding voltage data corresponding to the throttle opening of 0% have been sensed. If the answer is NO, then the program proceeds to a step 35. If the answer is YES, on the other hand, then $V'_0$ is stored in memory at a step 34 as new voltage data corresponding to the opening of 0%. It is determined at the step 35 whether voltage data $V'_{100}$ smaller in magnitude than the immediately preceding voltage data corresponding to the throttle opening of 100%. If the answer is NO, then the program proceeds to a step 37, at which the throttle opening $\theta_\beta$ is calculated in accordance with Eq. (2). If the answer is YES at the step 35, then $V'_{100}$ is stored in memory as the new voltage data corresponding to the opening of 100%, and then the throttle opening $\theta_\beta$ is calculated in accordance with Eq. (2).

Thus, in accordance with the present invention as described above, an adjustment is made so as to absorb any variance in the throttle opening - output voltage characteristic of the throttle opening sensor. As a result, an accurate throttle signal can be obtained at all times despite a change in the characteristic of the throttle opening sensor when the sensor is mounted or due to aging. This prevents any deviation in the shift point and lock-up point that might otherwise be caused by a variance in the characteristic of the throttle opening sensor, thereby making it possible to optimize a speed change.

As many apparently widely different embodiments of the present invention can be made without departing from the spirit and scope thereof, it is to be understood that the invention is not limited to the specific embodiments thereof except as defined in the appended claims.

What we claim is:

1. An electronically controlled automatic transmission having shift solenoids controlled by a microcomputer in dependence upon a vehicle velocity signal and a throttle opening signal, which comprises:

a throttle opening sensor for generating a voltage conforming to a throttle opening;

memory means for storing voltage data $V_0$ of a throttle opening of 0% and voltage data $V_{100}$ of a throttle opening of 100%;

means for comparing at least one of a sensed voltage data $V'_0$ of a throttle opening of 0% and a sensed voltage data $V'_{100}$ of a throttle opening of 100% respectively to $V_0$ and $V_{100}$ in said memory means and for rewriting at least one of $V_0$ in said memory means with $V'_0$ when $V_0$ and $V'_0$ are different and $V_{100}$ in the memory means with $V'_{100}$ when $V_{100}$ and $V'_{100}$ are different; and arithmetic means for calculating a throttle opening $\theta_\alpha$ corresponding to a sensed voltage data $V_\alpha$ based on a ratio of a difference between said voltage data $V'_0$ corresponding to a throttle opening of 0% in said memory means and said sensed voltage data $V_\alpha$ to a difference between said voltage data $V'_0$ corresponding to a throttle opening of 0% and said voltage data $V'_{100}$ corresponding to a throttle opening of 100% in said memory means.

* * * * *